United States Patent [19]

Colechia

[11] 4,002,098
[45] Jan. 11, 1977

[54] NOTCHED HEAD NAIL HAVING A PAIR OF DEPENDING ANNULARLY SPACED RADIAL ABUTMENT RIBS AND PACKAGE THEREOF

[75] Inventor: Edward A. Colechia, East Greenwich, R.I.

[73] Assignee: Textron Inc., Providence, R.I.

[22] Filed: May 7, 1975

[21] Appl. No.: 575,399

[52] U.S. Cl. .................................. 85/28; 206/343
[51] Int. Cl.² ........................................ F16B 15/02
[58] Field of Search .......... 85/28, 29, 17; 206/343, 206/344, 345, 347, 346

[56] References Cited

UNITED STATES PATENTS

| | | | |
|---|---|---|---|
| 3,481,459 | 12/1969 | Becht | 85/28 X |
| 3,696,701 | 10/1972 | Readthough | 85/28 |
| 3,835,991 | 9/1974 | Becht | 85/28 X |
| 3,861,526 | 1/1975 | Leistner | 85/28 X |

Primary Examiner—Ramon S. Britts
Attorney, Agent, or Firm—Cushman, Darby & Cushman

[57] ABSTRACT

A nail constructed with conventional heading equipment with a notched open-sided partially circular head having a pair of annularly spaced radially extending ribs depending from the underside thereof to permit burr growth without interfering with the interengagement of the downwardly facing abutment surface areas of the rib with upwardly facing mating abutment surface areas of the top surface of the head of an adjacent nail when a plurality of such nails is collated and secured in an angle stick package with the shanks and heads of adjacent nails in abutting relation.

11 Claims, 5 Drawing Figures

U.S. Patent  Jan. 11, 1977  4,002,098
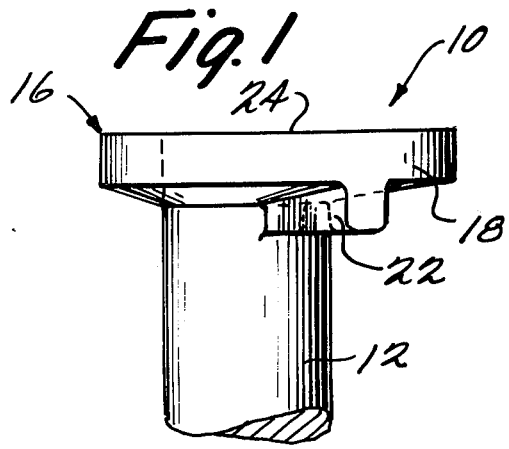
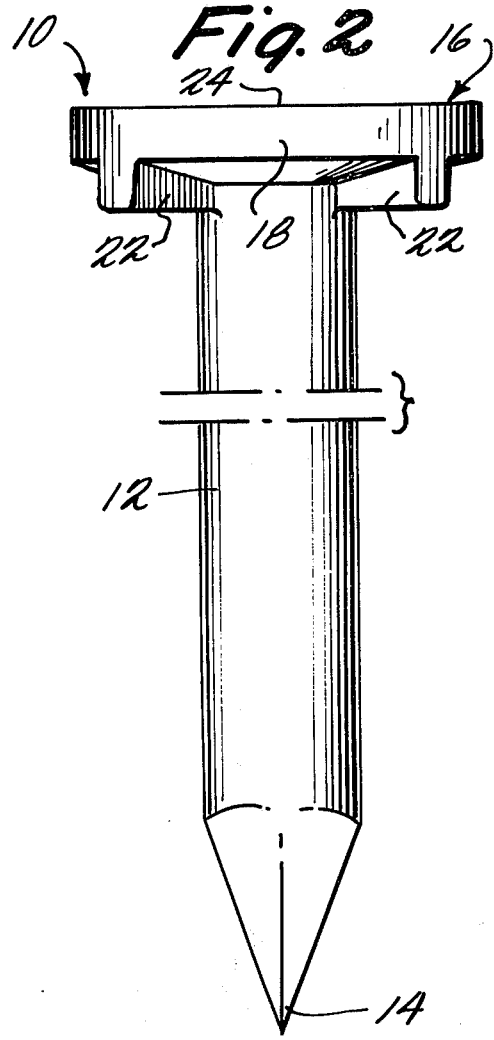
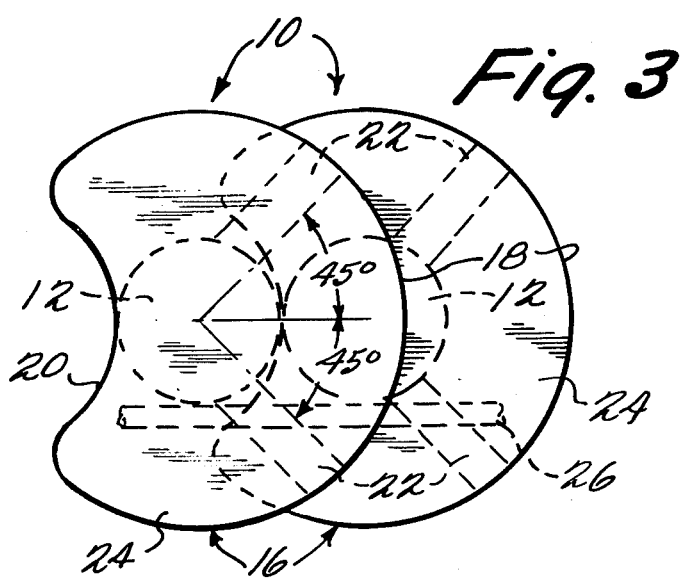
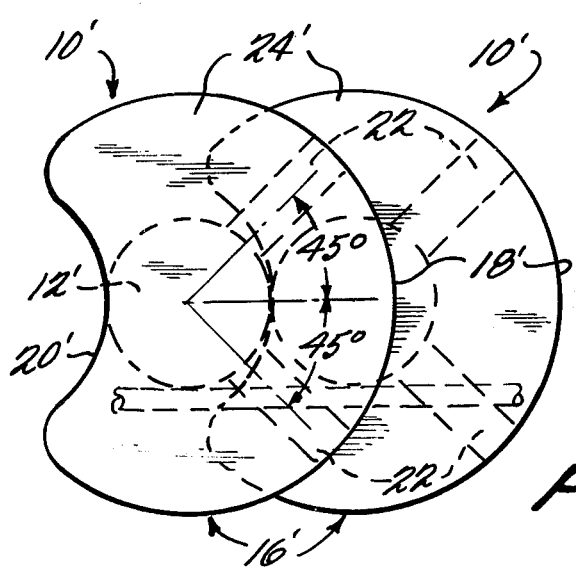
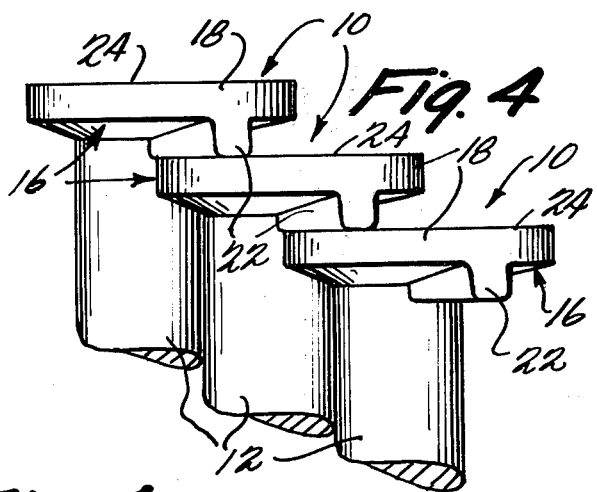

NOTCHED HEAD NAIL HAVING A PAIR OF DEPENDING ANNULARLY SPACED RADIAL ABUTMENT RIBS AND PACKAGE THEREOF

This invention relates to nails and more particularly to nails of the type individually manufactured on conventional mass production swaging or heading machines and subsequently collated and secured into abutting stick formation packages suitable for loading into and individual nail driving from a power actuated driving device.

Within the last two decades portable power operated fastener driving devices have come into widespread use, particularly pneumatically actuated devices of this type.

An inherent advantage of these devices which has been a significant factor in their acceptance is that they are capable of receiving a supply of fasteners in conveniently packaged form and to handle the same in a manner permitting successive individual fasteners to be driven in response to a simple manual actuating procedure such as pulling a trigger. The simplest fastener package and the one initially utilized consisted of a stick of staples quite similar to those utilized in conventional desk staplers. Fasteners such as staples and T-nails, because they are essentially constructed of uniform thickness, are easy to assemble in an abutting row formation, as by simple guides; easy to secure in such formation, as by an adhesive; easy to individually feed, as by a simple resilient bias of the stick in a direction to move a leading fastener into a drive track; and easy to drive, as by simply stripping the leading fastener from the stick by a driver.

Fasteners which varied in thickness, such as headed nails, required much more sophisticated package formation assembly, package securement and feeding and driving procedures. In general, it can be stated that stick packaging of full round head nails has not achieved any significant acceptance because of the excess spacing required between the shanks due to the existence of the lateral extension of the head throughout the entire peripheral extent of the shank. This spacing unfavorably affected the nail density of the packages, and presented severe securement difficulties. Consequently, coil formation packages of full round headed nails have achieved more widespread acceptance.

In recent years semi-circular head type nails, such as the so-called D-head nail or notched head nail have achieved increased acceptance as a desirable compromise in the known advantages and disadvantages between T-nails and full round head nails. In general, it can be stated that these nails achieve a measure of the head holding advantages which full headed nails have over T-nails and a measure of the packaging advantages which T-nails have over full headed nails. However, in achieving this balance of advantageous capabilities, there are also presented difficulties of a different nature resulting from the inherent non-symmetrical form of the head. These peculiar difficulties are encountered in the making of the nail, the assembly or collating of the nails after manufacture, the securement of the nails in stick formation after collation, the loading and feeding of the package in the device and the driving of individual nails from the package. Experience has shown that perhaps the most severe difficulty presented is the fact that all of these separately identifiable difficulties are inherently interrelated. All too often a proposed solution of one individual problem has resulted in aggravating another individual difficulty to the point of rendering the proposed solution unworkable.

For example, in U.S. Pat. Nos. 3,481,459 and 3,861,526 there are disclosed nails of this type in which the semi-round or open-sided head is generally formed of relatively small thickness measured in the direction of the shank axis. In conjunction with this generally thin head construction, there is provided on the underside of the head a depending integral formation which has a downwardly facing surface parallel with top surface of the head. In the earlier patent this formation assumed an interrupted collar configuration, while in the later patent the formation assumed an elongated ridge configuration extending along an axis bisecting the semi-round head. As indicated in these patents, the formations were provided for the purpose of enabling the heads of adjacent nails to abut one another, a functional attribute which materially assisted the collating procedures and enhanced the securement characteristics of the stick formation package. However, both of these patents are silent as to certain problems that arise when these configurations are actually manufactured on conventional nail heading equipment, which problem has serious deleterious effects on the very advantages attributable to the provision of the formations. This problem arises as a result of the parting line between the swaging tools of the heading equipment which occurs along the upper edge of the head defining the open side thereof. In actual practice the existence of the parting line results in the development of a slight burr at this edge which progressively grows in height as the swaging tools are worn by progressive use. The height of this burr at the point of the intersection of the edge with the shank can grow within the short time of one continuous production shift to an extent sufficient to completely distort the proper functioning of the depending formation of the head.

It will be understood that in both the interrupted collar configuration and the elongated ridge configuration the abutting contact area of the downwardly facing surface thereof with the top surface of the abutting head when in package row formation is a small area which extends inwardly from the central portion of the open-sided edge. Consequently, the aforesaid burr grows upwardly from the top surface of the head precisely within this area of contact. The result is that as production progressively advances the top of the burr becomes the contact point and the upward extent of the row formation gradually increases from the original desired angle to one which cannot be accommodated in the magazine of the device.

The economics of manufacture dictate a tool life which is at least one shift preferably considerably longer. The economics of manufacture further prohibit the cost of removing the burr before collation.

In U.S. Pat. No. 3,835,991 there is disclosed another configuration of depending formation in such a head which will accommodate the aforesaid burr growth. The depending formation in this patent is an abutment configuration spaced from the shank. While the aforementioned burr problem is not specifically mentioned in the patent, the spaced location of the abutment provides a contact area on the top surface of the adjacent nail head which is spaced from the area of burr growth thus permitting a satisfactory tool life. Whether or not the spaced position of the abutment of the patent was chosen to obviate the burr problem, the spaced position introduces other problems which make continuous production problematical. Specifically, since the material which forms the head comes from an end portion of shank stock, it becomes necessary in order to form the abutment to effectively change the direction of cold flow of the metal during the swaging action from radial to axial. This change is difficult to consistently achieve. Moreover, trapped air can present variations.

In commonly assigned application Ser. No. 566,432, filed Apr. 9, 1975 in the joint names of George M. Smith and Joseph Silva, there is disclosed another solution to the burr growth problem which avoids the last-mentioned difficulties. In this disclosure, the abutment utilized may be of the type disclosed in U.S. Pat. No. 3,861,526 and the open-sided peripheral edge of the nail head is recessed at least along the central portion thereof so that burr growth can take place within the recess.

While the recess arrangement constitutes a viable solution, the formation of the recess itself is not without its own particular difficulties. The necessity to provide a recess forming projection on the end of the plunger swaging tool constitutes an extra tooling operation, making its replacement and repair more difficult. Moreover, this configuration tends to diminish the life of the plunger swaging tool.

In accordance with the principles of the present invention there is provided a solution to the burr growth problem in a notched head nail which avoids the difficulties of the recess configuration while retaining the advantages thereof over the spaced abutment configuration by providing a pair of annularly spaced depending abutments beneath the head which extend generally radially outwardly from the shank periphery at positions spaced annularly on opposite sides of a median plane of symmetry of the shank and head. Since the dual abutments extend generally radially outwardly from the shank, there is no requirement that the metal which forms the abutments abruptly change flow direction or that the die cavity present the possibility of air trapping in operation. Moreover, the position of the mating surface areas on the top surface of the head are spaced from the central portion of the open-sided peripheral edge so as not to interfere with burr growth upwardly from the top surface of the head. This result is possible because of the particular nature of the burr growth in a notched head nail as compared with a D-head nail. In the usual notched head nail, the notch is formed by a portion of the plunger swaging tool which is formed from separate rod stock. Preferably, the rod stock is cylindrical and has a diameter dimension slightly greater than the shank diameter. Burr growth occurs because of wear on this rod and the female die cavity which receives it which ultimately permits deflection of the rod in a direction radially outwardly of the axis of the nail shank. This tendency to deflect is, of course, caused by the cold metal flow against the rod. Since the metal flow contact area of the rod is symmetrical about the common median plane of the shank and rod, metal flow forces imposed on the rod have only a resultant force component in the radial direction since force components normal thereto counterbalance one another in opposite directions. Burr growth, therefore, begins at the central portion of the notched open-sided peripheral edge where the greatest possible radial deflection of the rod is possible. At annular positions spaced 90° on opposite sides of the common median plane no radial component of deflection can occur. The radial component therefore gradually diminishes from maximum at the common median plane to zero at the 90° positions. Burr growth reflects this geometric consideration in that the burr in a notched head nail always has a maximum height at the median plane and diminishes to zero as it extends annularly in both directions. Thus, since the mating top surface areas are annularly spaced from the median plane considerable burr growth can take place before any appreciable vertical height is established within the mating surface areas.

Accordingly it is an object of the present invention to provide a nail constructed in accordance with the above principles so as to obtain the advantages previously recited. Another advantage of the present invention is that the abutment elements when constructed, as preferred, in the form of elongated ribs serve as strengthening ribs for the head enabling the same to have maximum strength with a minimum of material.

Another object of the present invention is the provision of a nail construction and stick package thereof which is simple in construction, economical to manufacture and effective in operation.

These and other objects of the present invention will become more apparent during the course of the following detailed description and appended claims.

The invention can best be understood with reference to the accompanying drawings wherein an illustrative embodiment is shown.

In the drawings:

FIG. 1 is a fragmentary side elevational view of a nail showing the improved head construction of the present invention;

FIG. 2 is an elevational view, partly broken away, of the nail shown in FIG. 1 looking toward the full side thereof;

FIG. 3 is a fragmentary top plan view of a nail stick package embodying the principles of the present invention, showing two abutting nails of the package;

FIG. 4 is a view similar to FIG. 1 of the nail stick package of FIG. 3 showing the upper head portions of three abutting nails of the package, with certain parts broken away to illustrate how the effects of burr growth are obviated by the recess configuration; and FIG. 5 is a view similar to FIG. 3, showing a modified form of a nail construction embodying the principles of the present invention.

Referring now more particularly to the drawings, there is shown therein a nail, generally indicated at 10, which embodies the principles of the present invention. The nail 10 includes the usual shank 12, having a workpiece entering point construction 14 (see FIG. 2) formed on one end thereof and a head construction 16 formed on the other end thereof which embodies the improvements of the present invention.

It will be understood that the shank 12 may assume any desired conventional construction, the configuration shown in the drawings being cylindrical with a smooth periphery. Other cross-sectional configurations may be employed, as, for example, the cylindrical configuration modified with flats disclosed in U.S. Pat. No. 3,481,459. Likewise, the periphery of the shank may assume known configurations other than the exemplary smooth configuration shown, such as a ringed configuration, a spiral fluted configuration or the like. The point construction 14 may likewise assume any known configuration, as, for example, a diamond point configuration, a chisel point configuration, etc.

In accordance with the principles of the present invention, the head construction is of notched open-sided configuration. The notched head configuration provides a generally partially circular peripheral edge 18 interconnected by a concavely curved open-sided peripheral edge 20 (see FIG. 3) which is arcuate and extends inwardly in aligned tangential relation to an adjacent peripheral portion of the shank.

In accordance with the principles of the present invention the head construction 16 includes a pair of annularly spaced abutment elements 22 depending from the underside thereof. The abutment elements are generally of elongated rib formation and extend generally radially outwardly from the periphery of the shank toward the partially circular peripheral edge 18. In the embodiment shown, the abutment elements 22 are spaced apart annularly approximately 90°, each being spaced annularly approximately 45° from a median plane of symmetry of the head 16 and shank 12. As shown, the ribs 22 include generally parallel side walls and define a downwardly facing abutment surface area. The two adjacent side walls of the two ribs extend in generally radial planes spaced on opposite sides of the median plane approximately 45° as shown in FIG. 3. It will be understood that the side walls of each rib need not be parallel as shown but may converge downwardly if desired. Likewise, they may converge in the radially outward direction as well.

FIG. 5 illustrates another variable in the abutment element construction which is within the contemplation of the present invention. In this embodiment wherein corresponding parts are indicated by corresponding printed numerals, the abutment rib elements 22' are formed so as to be symmetrical with respect to median planes which are radial with respect to the axis of the shaft. The median planes of the ribs are disposed approximately 45° on opposite sides of the median plane of the head 16' and shank 12'.

The head construction 16 includes a planar top surface 24 which provides a pair of mating abutment surface areas which face upwardly. Preferably, these surface areas are provided entirely by portions of the head construction disposed radially outwardly of the periphery of the shank. As with the downwardly facing abutment surface areas of the ribs 22, the mating upwardly facing abutment surface areas are spaced equally on opposite sides of the median plane of symmetry of the head and shank.

FIGS. 3 and 4 illustrate the collation and securement of a plurality of nails 10 in an angled stick package. By providing an open-sided edge 20, a pair of abutment surface areas on the depending ribs 22 and mating surface areas in the top surface 24 of each nail 10, it becomes possible to collate a plurality of nails in a row formation with the shanks and heads of adjacent nails in abutting relation. This relationship enables the collating equipment to be run at maximum speeds since the interengagement of the mating abutment surface areas of the nails themselves automatically determines the proper angle to the row formation. Once collated, the nails can be secured in the row formation in any conventional fashion. A preferred means for effecting securement is to weld a pair of parallel wires 26 to one side of the shanks in accordance with the teachings of U.S. Pat. No. 3,083,369 with the wire extending parallel with the angular extent of the row formation.

It will be noted from both FIGS. 3 and 5, that the common areas of the mating abutment surfaces of the two adjacent nails are spaced from the position of shank abutment and burr growth, namely the central portion of the shank periphery where the notched peripheral edge 20 is in alignment therewith. Since the portion of the head 16 of the uppermost nail 10 which overlies this position on the adjacent nail 10 is spaced upwardly therefrom by virtue of the depending rib elements 22, considerable burr growth can take place before any appreciable height is developed along the edge 20 within the common surface areas of contact.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A nail including a shank provided by a length of metal strand material severed at one end from an end portion of a supply of such material and formed thereon with a workpiece entering configuration, said shank having an integral enlargement on the opposite end portion thereof formed in such a way that there is a tendency for a burr to grow upwardly therefrom in a position hereinafter set forth, said enlargement defining a head configured to facilitate collation of said nail with similar nails in a row formation in which the shanks of adjacent nails are in abutting parallel relation and the heads of adjacent nails are in overlapping abutting relation, said head extending radially outwardly from said shank substantially throughout the entire periphery thereof and terminating in a partially circular peripheral edge of greater than 180° generally arcuate about the axis of said shank interconnected by a concavely curved open-sided peripheral edge disposed in aligned relation at its central portion with an adjacent peripheral portion of said shank, the position of said aligned relation constituting the position of burr growth, the lower portion of said head bounded by said partially circular peripheral edge and extending radially outwardly from said shank having a pair of annularly spaced abutment elements depending therefrom, said head and shank being symmetrical with respect to a median plane which passes through the aforesaid aligned portions of said shank and said open-sided peripheral edge, said abutment elements extending outwardly from the adjacent periphery of said shank toward said partially circular peripheral edge in annularly spaced relation to a peripheral portion of said shank opposed to the aforesaid adjacent peripheral portion in aligned relation with said open-sided peripheral edge and symmetrical relation with said median plane, said abutment elements defining a pair of annularly spaced downwardly facing abutment surfaces disposed in general alignment, the upper portion of said head having a top surface including a pair of mating upwardly facing abutment surface areas extending inwardly from said open-sided peripheral edge in spaced relation to the aforesaid central portion thereof disposed in aligned relation with said shank adjacent peripheral portion.

2. A nail as defined in claim 1 wherein said concavely curved open-sided peripheral edge is arcuate.

3. A nail as defined in claim 2 wherein said mating upwardly facing surface areas are defined totally by portions of said head disposed radially outwardly of the periphery of said shank.

4. A nail as defined in claim 3 wherein said abutment elements are in the form of elongated ribs extending generally radially with respect to said shank.

5. A nail as defined in claim 4 wherein each of said ribs includes a side wall which extends in a radial direction, said side walls being disposed in generally opposed relation with respect to each other in an equally angularly spaced relation of approximately 45° with respect to said median plane.

6. A nail as defined in claim 4 wherein each of said ribs is symmetrical with respect to a radially extending median plane, the radially extending median planes of said ribs being displaced approximately 45° from the median plane of said head and shank in opposite directions.

7. A nail as defined in claim 1 wherein said mating upwardly facing surface areas are defined totally by portions of said head disposed radially outwardly of the periphery of said shank.

8. A nail as defined in claim 1 wherein said abutment elements are in the form of elongated ribs extending generally radially with respect to said shank.

9. A nail as defined in claim 8 wherein each of said ribs includes a side wall which extends in a radial direction, said side walls being disposed in generally opposed relation with respect to each other in an equally angularly spaced relation of approximately 45° with respect to said median plane.

10. A nail as defined in claim 9 wherein the radially extending median planes of said ribs are displaced approximately 45° from the median plane of said head and shank in opposite directions.

11. A nail as defined in claim 1 in combination with a plurality of similarly constructed nails disposed in an angularly extending row formation with adjacent nails of the row having their shanks in abutting parallel relation and the mating surface areas of the heads thereof in abutting relation, and means for securing said nails in said row formation.

* * * * *